(12) United States Patent
Petty

(10) Patent No.: US 7,233,895 B2
(45) Date of Patent: Jun. 19, 2007

(54) APPARATUS AND METHOD TO COMPENSATE FOR UNSYNCHRONIZED TRANSMISSION OF SYNCHROUS DATA USING A SORTED LIST

(75) Inventor: Norman W. Petty, Columbia Falls, MT (US)

(73) Assignee: Avaya Technology Corp., Basking Ridge, NJ (US)

( * ) Notice: Subject to any disclaimer, the term of this patent is extended or adjusted under 35 U.S.C. 154(b) by 1085 days.

(21) Appl. No.: 10/159,438

(22) Filed: May 30, 2002

(65) Prior Publication Data

US 2003/0223443 A1 Dec. 4, 2003

(51) Int. Cl.
G10L 11/02 (2006.01)
H04J 3/17 (2006.01)

(52) U.S. Cl. ............... 704/215; 370/505; 370/516

(58) Field of Classification Search ............... 704/201, 704/210, 215, 226; 370/503, 504, 516, 519; 375/240.11, 240.21
See application file for complete search history.

(56) References Cited

U.S. PATENT DOCUMENTS

| | | | |
|---|---|---|---|
| 5,063,444 A * | 11/1991 | Knauer et al. ......... | 375/240.11 |
| 5,659,541 A * | 8/1997 | Chan ........................... | 370/236 |
| 5,790,538 A | 8/1998 | Sugar | |
| 5,793,772 A * | 8/1998 | Burke et al. ................ | 370/508 |
| 6,144,696 A * | 11/2000 | Shively et al. .............. | 375/222 |
| 6,157,653 A | 12/2000 | Kline et al. | |
| 6,259,677 B1 | 7/2001 | Jain | |
| 6,285,708 B1 * | 9/2001 | Shively et al. .............. | 375/222 |
| 6,580,694 B1 * | 6/2003 | Baker ......................... | 370/252 |
| 7,006,511 B2 * | 2/2006 | Lanzafame et al. ......... | 370/412 |
| 7,133,411 B2 * | 11/2006 | Petty .......................... | 370/412 |
| 2002/0016161 A1 * | 2/2002 | Dellien et al. .............. | 455/403 |
| 2002/0044597 A1 * | 4/2002 | Shively et al. .............. | 375/222 |
| 2002/0105375 A1 * | 8/2002 | Sorokine ..................... | 329/345 |
| 2003/0013457 A1 * | 1/2003 | Amerga et al. ............. | 455/456 |
| 2003/0191631 A1 * | 10/2003 | Chan et al. ................. | 704/201 |
| 2004/0076191 A1 * | 4/2004 | Sundqvist et al. .......... | 370/516 |

OTHER PUBLICATIONS

U.S. Appl. No. 10/159,622, filed May 30, 2002, Norman Petty.

* cited by examiner

Primary Examiner—Martin Lerner
(74) Attorney, Agent, or Firm—John C. Moran

(57) ABSTRACT

A low energy detector maintains a sorted list that defines to the circuit removing samples from the queue the location and energy of all samples that fall below the predetermined energy level. This allows a circuit removing samples to execute an algorithm that allows samples to be deleted in accordance with a predetermined pattern.

15 Claims, 12 Drawing Sheets

| ENERGY LEVEL | POSITION IN QUEUE |
|---|---|
| 1008 | 1009 |
| | |
| | |
| | |
| | |
| | |
| | |
| | |
| | |
| | |
| | |
| | |

US 7,233,895 B2

APPARATUS AND METHOD TO COMPENSATE FOR UNSYNCHRONIZED TRANSMISSION OF SYNCHROUS DATA USING A SORTED LIST

TECHNICAL FIELD

This invention relates to the transmission of digitally encoded voice, and in particular, to the transmission of digitally encoded voice between a circuit switching network and a packet switching network so as to maintain speech quality.

BACKGROUND OF THE INVENTION

In the transmission of digitally encoded voice, it is important to maintain synchronization between the two end points so that no digital information is lost due to differing rates of transmission and reception. Synchronization is the ability to maintain a stable frequency and precise timing to allow digital transmission services to read data out and read data into the transmission system at the same rate. Without synchronization, rates differ and data slippage occurs resulting in data being lost. Within the prior art, circuit switch networks and packet data switching networks when operating independently of each other have solved this problem in the following manner. In circuit switched networks, synchronization is centrally located and is synchronized throughout continental United States. For example, long distance transmission carriers, such as AT&T, have placed synchronization technologies in there central offices and relied on T1 trunk-based recovery network timing subsystems to synchronize data being received from the network. Packet switched network have allowed the receiving endpoint to signal the transmitting endpoint to slow or speed-up the transmission rate. This type of control is utilized in asynchronous transfer mode (ATM) and frame relay transmission (FR). However, the internet protocol (IP) transmission systems provide no such synchronization mechanism even though they are packet switched networks.

The prior art methods for achieving synchronization in circuit switched networks and packet switched network performed well if the two types of networks were not interconnected. An exception to this situation was in the situation where ATM or frame relay was utilized with a circuit switched network with the same data transmission company controlling both systems. Within the present business communication switching environment, there exists a need for simplified maintenance, management, and access to voice information on diverse networks. This need is forcing the convergence of a variety of circuit switched and packet switched networks. In addition, a new class of real-time multimedia networks is emerging that will also require synchronization.

The combination of a circuit switched network and a packet switched network is referred to as a hybrid network. Hybrid networks that lack synchronization exhibit the same symptoms as if packets were being lost within a packet switching system with some asymmetry. (1) If the read-out is faster than the read-in, eventually the reader exhausts the jitter-buffers and must wait for them to refill. The voice coder sees an empty stream of voice information and hence the voice quality suffers remarkably. (2) If the read-out is slower than the read-in, eventually the jitter-buffers fill full, and new packets are discarded. The voice coder sees a loss of packets and again the voice quality suffers.

A prior art solution for interconnecting a hybrid network is illustrated in FIG. 1. Synchronous physical (PHY) interface 101 is reading out PCM voice samples to voice coder 106 via path 114. Voice coder 106 transmits these PCM packets via path 113 to IP switched network 107. IP switch network 107 transmits packets containing PCM samples to voice coder 106 which transmits these to PHY 101 via elements 102, 103, and 104 and paths 108, 109, and 111. PHY 101 utilizes insert/remove circuit 102 to obtain the packets that are being placed in sampled queue 104 by voice coder 106. Insert/remove circuit 102 adds or deletes PCM samples as required to maintain a synchronous transfer of data to PHY 101. Insert/remove circuit 102 performs this activity by utilizing low energy detector 103. Low energy detector 103 evaluates the PCM sample that will next be transmitted from sample queue 104 to circuit 102 via path 109. Low energy detector 103 indicates to circuit 102 if the energy contained within the PCM sample is below a predefined threshold and may be discarded. If there is not a sample present in sample queue 104 and a sample is required to be transmitted to PHY 101, insert/remove circuit 102 transmits a low energy PCM sample. When insert/remove circuit 102 has to delete samples being received from sample queue 104, circuit 102 deletes any present sample indicated by low energy detector 103 as being below predefined energy value requirement. Circuit 102 commences this operation at some predefined capacity of sample queue 104. The problem with this prior art solution is that insert/remove circuit 102 has no knowledge of the number or location of PCM samples that are below the predefined energy value within sample queue 104. Hence, for example, if circuit 102 determines that it must delete five PCM samples, circuit 102 will delete the next five PCM samples that low energy detector 103 indicates are below the minimum energy level. This can result in deletion of samples over a small period of time and cause deterioration of the voice quality being produced by PHY 101.

SUMMARY OF THE INVENTION

This invention is directed to solving these and other problems and disadvantages of the prior art. In an embodiment of the invention, the low energy detector maintains a sorted list that defines to the circuit removing samples from the queue the location and energy of all samples that fall below the predetermined energy level. This allows the circuit removing samples to execute an algorithm that allows samples to be deleted in accordance with a predetermined pattern.

DETAILED DESCRIPTION

Figure 1:
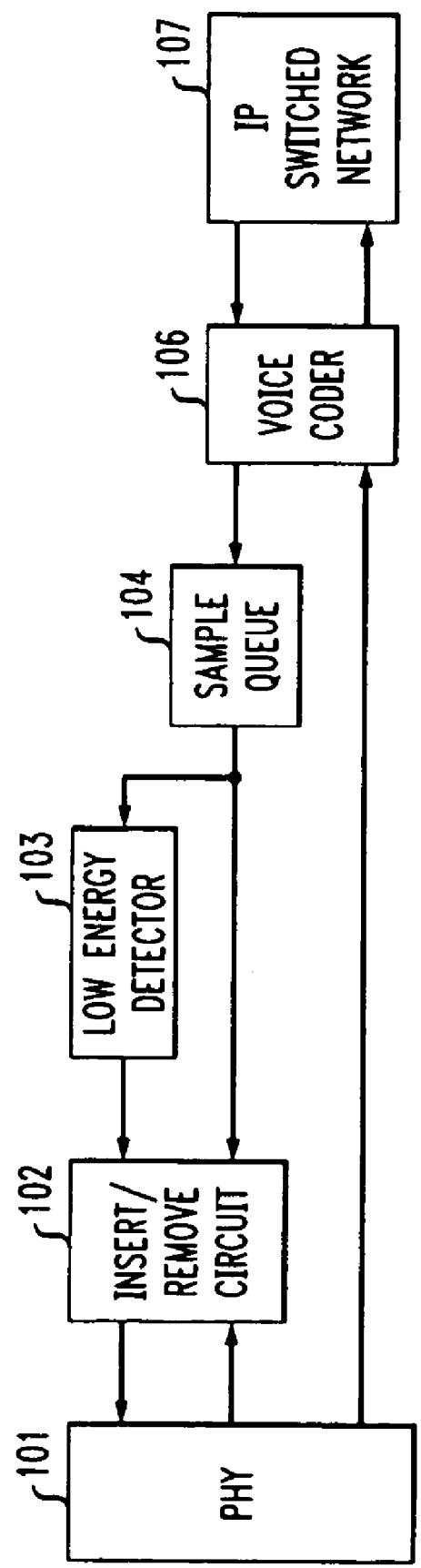
FIG. 1 illustrates a prior art system.
Figure 2:
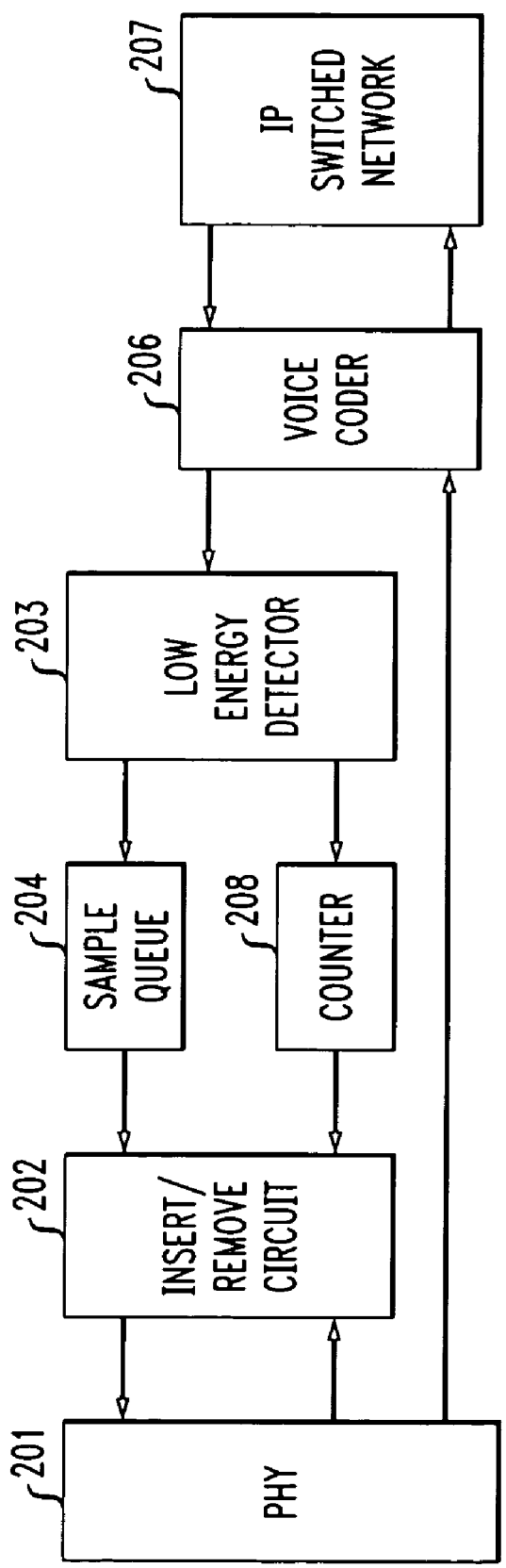
FIG. 2 illustrates a first embodiment of the invention.

FIG. 2 illustrates a system for implementing the first embodiment of the invention. Synchronous physical (PHY) interface 201 is exchanging digital samples with IP switch network 207 via voice encoder 206. Voice samples being received from IP switch network 207 are received by voice coder 206 and then processed by elements 202–204 and 208 before being transferred to PHY 201. Insert/removal circuit 202 is responsible for maintaining a steady synchronous stream of voice samples to PHY 201 in accordance with the requirements of PHY 201. If circuit 202 determines that there is not a sample in sample queue 204, circuit 202 transmits a digital sample containing low energy, i.e. silence, to PHY 201. However, if circuit 202 determines that sample queue 204 is approaching a predetermined capacity, circuit 202 commences to delete some of the samples containing silence from sample queue 204 as they are to be transmitted to circuit 202 by queue 204.

Circuit 202 utilizes the contents of counter 208 to perform the determination of which digital samples to delete. Counter 208 is incremented by low energy detector 203 each time low energy detector 203 receives a digital sample from voice coder 206 that is below a predetermined energy level. Low energy detector 203 increments counter 208 and transfers the digital sample to sample queue 204. Low energy detector 203 also marks the sample in sample queue 204 as having low energy. Each time that circuit 202 deletes a digital sample being received from sample queue 204, circuit 202 decrements counter 208. Hence, counter 208 always reflects the number of digital samples in sample queue 204 that are below a predefined energy level. As is described in greater detail in FIGS. 6, 7, and 8, circuit 202 utilizes the contents of counter 208 to provide the highest voice quality of the digital samples being transferred to PHY 201. In addition, greater detail is illustrated in FIG. 9 concerning the operations of low energy detector 203.

Figure 3:
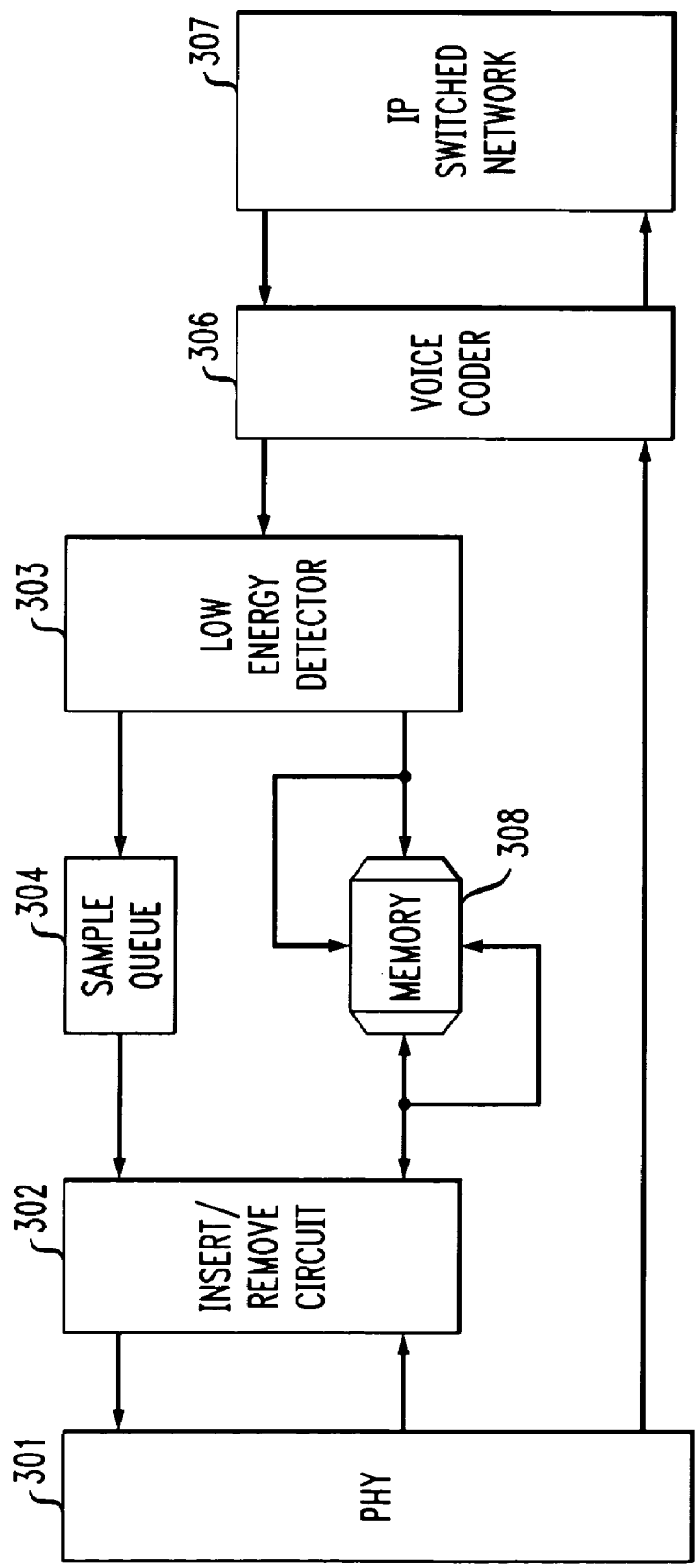
FIG. 3 illustrates a second embodiment of the invention.

FIG. 3 illustrates a second embodiment of the invention. Elements 301–307 perform similar operations to those performed by elements 201–207 of FIG. 2. The functions performed by insert/remove circuit 302 and low energy detector 303 are different than those performed by elements 202 and 203 with respect to lower level functions. Dual port memory 308 is utilized to maintain a sorted list that is added to by low energy detector 303, and items are removed from the sorted list by insert/removed circuit 302. The list maintained in memory 308 is sorted by energy levels that are below a predefined energy level with only references to those samples being placed in memory 308. Memory 308 also maintains a key to the list in time slot order so that samples can be removed when played out, inserted, or removed. The samples themselves are stored in sample queue 304. In addition, each energy level contained in memory 308 also has a reference to that sample's place in sample queue 304. The sorted list is illustrated in FIG. 10. Word 1001 contains the lowest energy level with the energy level being placed in field 1008 of column 1006 and the position within sample queue 304 being inserted into column 1007 in field 1009. Word 1002 contains a reference to a digital sample having the next higher energy, and word 1003 contains reference to a digital sample having even a higher energy. The highest energy within the sorted queue is referenced by word 1004.

Figure 11:
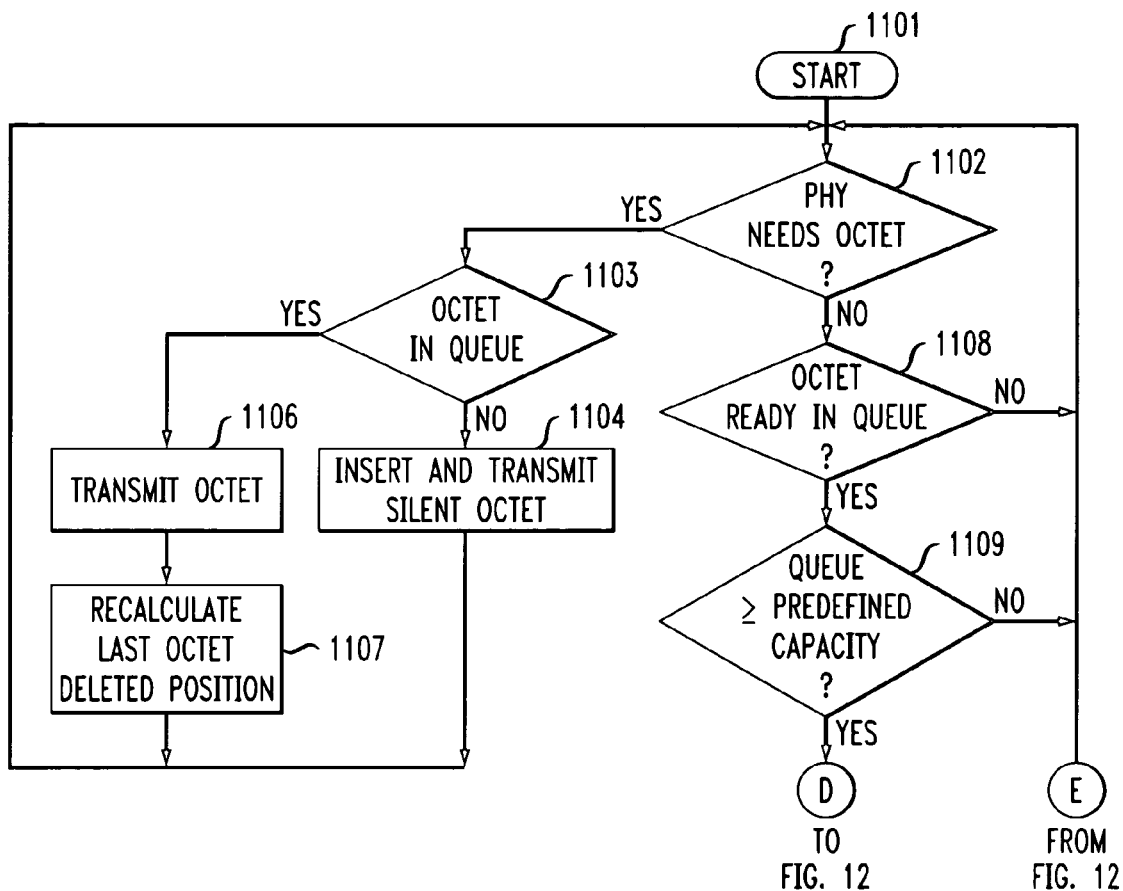
FIGS. 11 and 12 illustrate, in flowchart form, the operations performed by insert/removal circuit in implementing the second embodiment of the invention.
Figure 12:
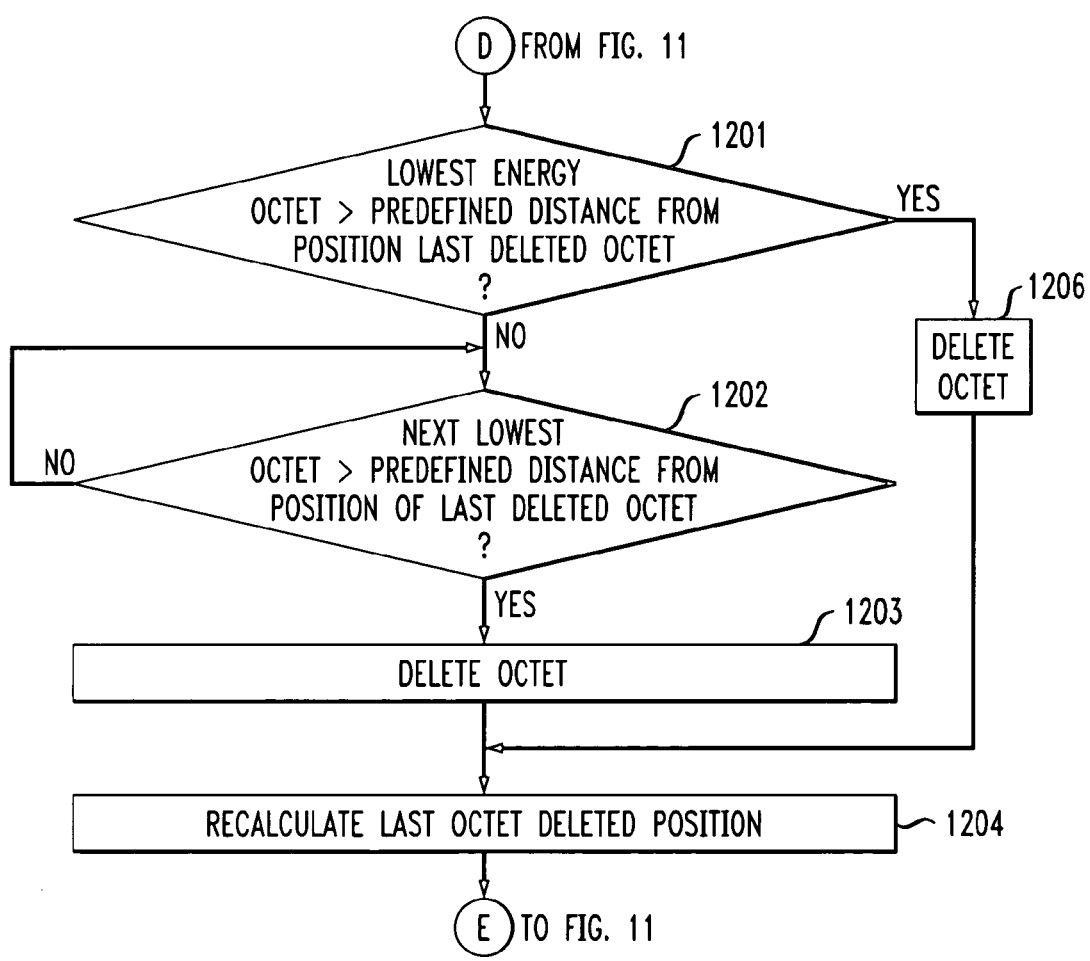

In operation, when low energy detector 303 receives a digital sample from voice coder 306, it determines if this digital sample is below the predefined energy level. If the digital sample is below the predefined energy level, low energy detector 303 searches through the energy levels of column 1006 until it determines where the energy level of the present sample belongs. Upon determining where this energy level should be placed, low energy detector 303 inserts this energy level into the sorted list of FIG. 10 and designates where in the sample queue 304 this digital sample is located. When insert/remove circuit 302 determines that it must delete a digital sample, it accesses the sorted list of FIG. 10 to find the digital sample that has the lowest energy. Utilizing the reference to the position in sample queue 304 of this digital sample, insert/remove circuit 302 deletes the identified digital sample from sample queue 304 and modifies the sorted list of FIG. 10 to reflect this deletion. Advantageously, as is illustrated in FIGS. 11 and 12 and accompanying text related, insert/remove circuit 302 also can execute a more complex algorithm to assure that the digital samples transferred to PHY 301 produce an acceptable quality of voice.

Figure 4:
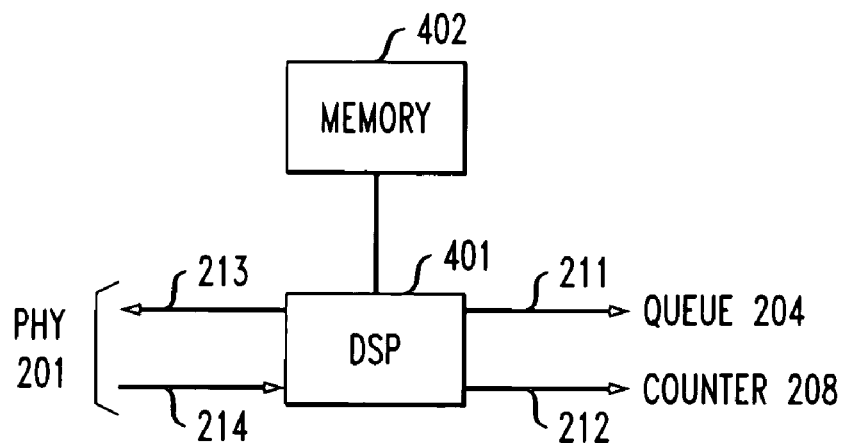
FIG. 4 illustrates, in block diagram form, insert/removal circuit of FIG. 3.

FIG. 4 illustrates, in block diagram form, insert/remove circuit 202 of FIG. 2. Insert/remove circuit 302 of FIG. 3 is of a similar design. Digital signal processor (DSP) 401 performs all of the required functions utilizing memory 402 for program and data storage. Data is received from sample queue 204 via path 211, and insert/remove circuit 202 functions with counter 208 via path 212. Insert/remove circuit 202 transfers data to PHY 201 via path 213 and receives and transmits signaling via path 214. The operations performed by DSP 401 are illustrated in detail in the flowchart of FIGS. 6, 7, and 8. FIGS. 11 and 12 illustrate the flowchart for the operations of DSP 401 if it is functioning in insert/remove circuit 302 of FIG. 3.

Figure 5:
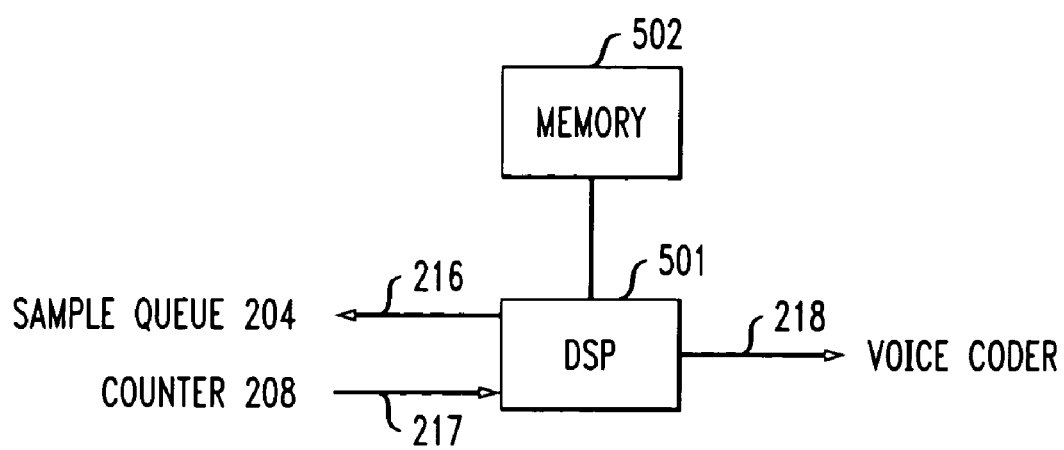
FIG. 5 illustrates, in block diagram form, low energy detector and low energy detector.

FIG. 5 illustrates a block diagram of low energy detector 203 of FIG. 2. Low energy detector 303 of FIG. 3 would be of a similar design. DSP 501 in conjunction with memory 502 performs all the operations illustrated in the flowchart of FIG. 9.

Figure 6:
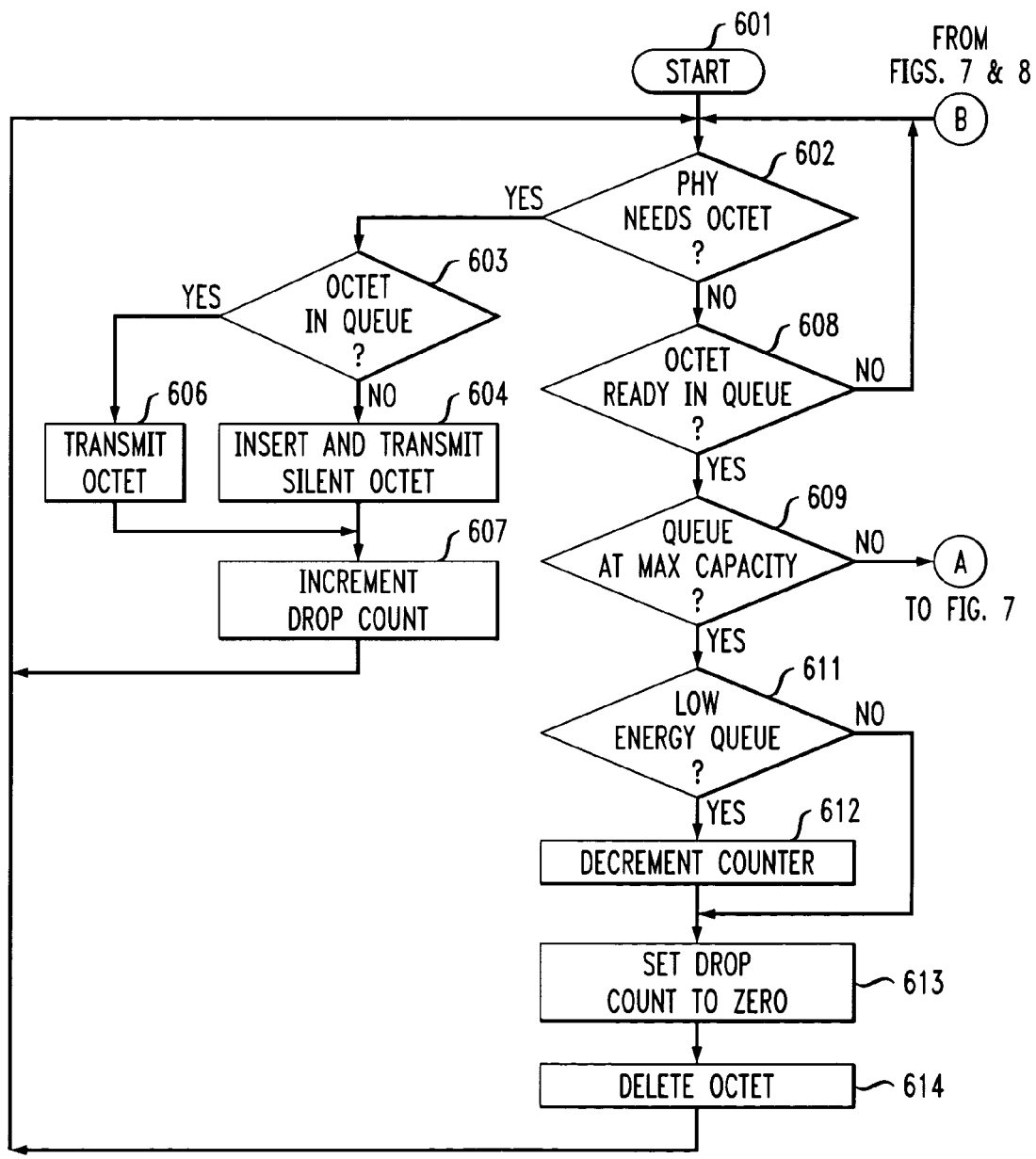
FIGS. 6, 7 and 8 illustrate, in flowchart form, the steps performed by insert/removal circuit in implementing the first embodiment of the invention.
Figure 7:
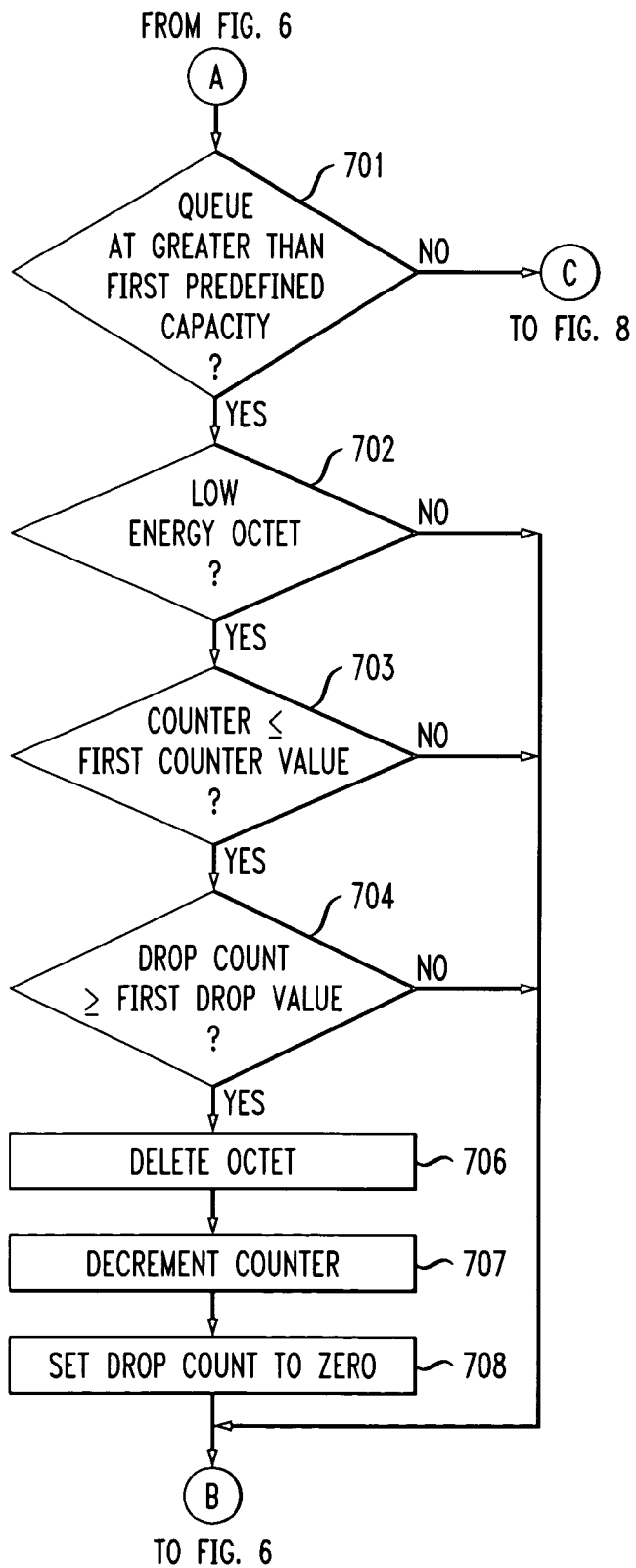
Figure 8:
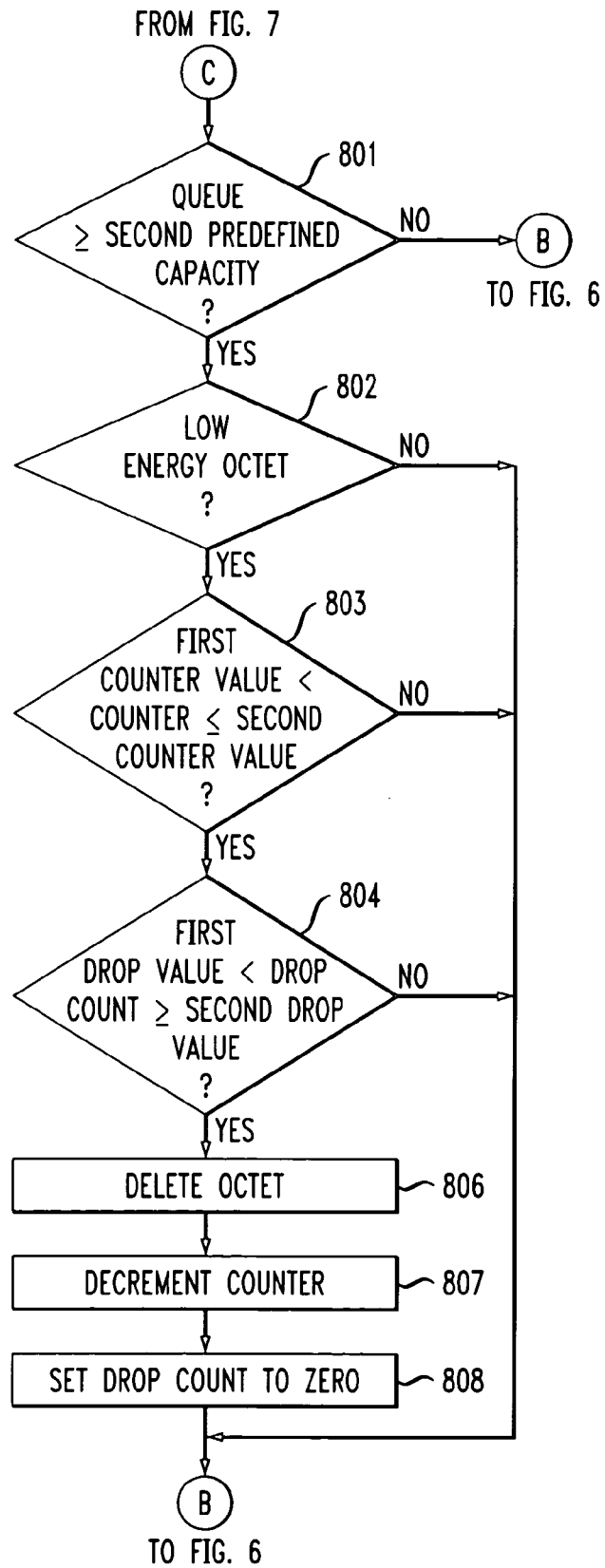
Figures 9, 10:
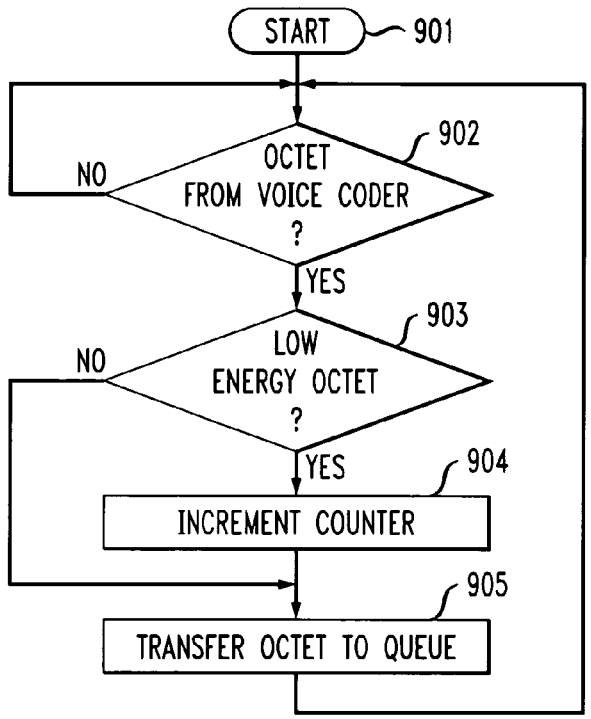
FIG. 9 illustrates, in flowchart form, the steps performed by low energy detector in implementing the first embodiment of the invention.
FIG. 10 illustrates a sort list table used in implementing the second embodiment of the invention.

FIGS. 6, 7, and 8 illustrate the operations performed by insert/remove circuit 202 of FIG. 2. Circuit 202 performs operations that assure that the packets being deleted are done in a distributed manner when it is necessary to drop packets coming from queue 204. To perform these tasks, circuit 202 utilizes the content of counter 208 and an internal counter that maintains the number of samples that has been transferred to PHY 201 since the last sample was deleted. The contents of this internal counter is referred to as the drop count. After being started in block 601 at the request of the PHY, decision block 602 determines if the PHY requires an octet. If the answer is yes, decision block 603 is executed to determine if there is an octet in the queue. If the answer is yes, block 606 transmits this octet to the PHY, and block 607 increments the drop count before returning control back to decision block 602.

If the answer in decision block 602 is no, decision block 608 determines if there is an octet ready for transmission in the queue. If the answer is no, control is transferred back to decision block 602. If the answer is yes, decision block 609 determines if the queue is at maximum capacity. If the answer is no, control is transferred to decision block 701 of FIG. 7. If the answer is yes, decision block 611 determines if the octet that is ready in the queue is a low energy octet. If the answer is yes, block 612 decrements the counter, block 613 sets the drop count to 0, and block 614 deletes the octet before transferring control back to decision block 602. If the answer in decision block 611 is no, control is transferred to block 613.

Returning to decision block 609, if the answer is no, control is transferred to decision block 701 of FIG. 7. Decision block 701 determines if the queue is greater than a first defined capacity. This first defined capacity is a capacity less than the maximum capacity. If the answer in decision block 701 is no, control is transferred to decision block 801 of FIG. 8. If the answer in decision block 701 is yes, control is transferred to decision block 702. Decision block 702 determines if the octet being received from the queue is a low energy octet. If the answer is no, decision block 702 returns control back to decision block 602 of FIG. 6. If the answer is yes, decision block 703 determines if the counter is less than a first counter value. If the answer is no, control is transferred back to decision block 602. If the answer is yes, decision block 704 determines if the drop count is greater than or equal to a first drop value. If the answer is no, control is transferred back to decision block 602 of FIG. 6. If the answer is yes, indicating that the number of octets transferred to PHY is greater than this first drop value since the last octet was deleted, control is transferred to block 706 which deletes the octet. Block 707 decrements the counter. Block 708 sets the drop count to zero before returning control back to decision block 602 of FIG. 6.

Returning to decision block 701, if the answer is no, control is transferred to decision block 801. Decision block 801 determines if the queue is at greater than a second predefined capacity. This second predefined capacity is less than the first predefined capacity. If the answer is no, control is transferred back to decision block 602 of FIG. 6. If the answer is yes, control is transferred to decision block 802, which determines if the present octet is a low energy octet. If the answer is no, control is transferred back to decision block 602 of FIG. 6. If the answer is yes, decision block 803 determines that the value of the counter is greater than the first counter value but less than a second counter value. If the answer is no, control is transferred back to decision block 602. If the answer is yes, decision block 804 determines if the drop count is greater than the first drop value but less than or equal to the second drop value. If the answer is no, control is transferred back to decision block 602. If the answer is yes, block 806 deletes the octet. Block 807 decrements the counter, and block 808 sets the drop count to zero before returning control back to decision block 602.

FIG. 9 illustrates the operations performed by low energy detector 203 of FIG. 2. After being started in block 901, decision block 902 determines if an octet has been received from the voice coder. If the answer is no, decision block 902 is re-executed. If the answer is yes, decision block 903 determines if the received octet is a low energy octet. If the answer is yes, block 904 increments the counter, and block 905 transfers the octet to the queue before returning control back to decision block 902. If the answer in decision block 903 is no, control is transferred to block 905.

FIGS. 11 and 12 illustrate, in flowchart form, the operations performed by insert/remove circuit 302 of FIG. 3. As will explained in greater detail with respect to FIG. 13, low energy detector 303 manages the sorted list in memory 308 of FIG. 3 such that a sorted list of references to octets in sample queue 304 is maintained and are sorted by the lowest energy octet to the highest energy octet. The highest level energy octet is still less than a predefined energy level. When it becomes necessary for circuit 302 to delete an octet to maintain the capacity of sample queue 304 at the proper level, circuit 302 utilizes the lowest energy level octet referenced by memory 308 to be deleted from sample queue 304. However, this lowest energy level octet must be a predefined distance from the last octet that was deleted from sample queue 304. If the lowest level energy octet is not a predefined distance from the last deleted octet, then the next highest level energy octet is utilized under a similar condition of being a predetermined distance from the last deleted octet. Circuit 302 maintains and continuously updates the location of the last octet deleted (also referred to as position).

After being started in 1101, decision block 1102 determines if the PHY needs another octet. If the answer is yes, decision block 1103 determines if there is another octet ready in the queue. If the answer is no, block 1104 inserts and transmits a silent octet to the PHY before returning control back to decision block 1102. If the answer is yes, block 1106 transmits the octet from the queue, and block 1107 recalculates the position of the last octet deleted. This is necessary since an octet has been removed from the queue. After execution of block 1107, control is transferred back to decision block 1102.

If the answer in decision block 1102 is no, decision block 1108 determines if an octet is ready in the queue. If the answer is no, control is transferred back to decision block 1102. If the answer is yes, decision block 1109 determines if the capacity of the queue is greater than a predefined capacity. This predefined capacity is one at which octets will be deleted to achieve this predefined capacity. If the answer in decision block 1109 is no, control is transferred back to decision block 1102. If the answer in decision block 1109 is yes, control is transferred to decision block 1201 of FIG. 12.

Decision block 1201 determines if the position of the lowest energy octet as referenced in the sorted list is greater than a predefined distance from the position of the last deleted octet. This is done to smooth out the affect of deleting octets. If the answer is yes, control is transferred to block 1206 which deletes the octet. Control next is transferred to block 1204 which recalculates the position of the last octet deleted. (Sets it to the position of the just deleted octet). Returning to decision block 1201, if the answer is no, decision block 1202 goes to the next octet in the sorted list to determine if its position is greater than a predefined distance from the position from the last deleted octet. If the answer is no, this operation is repeated by choosing another octet referenced in the sorted list. If the answer is yes, block 1203 deletes the octet from the queue before transferring control to block 1204. After execution of block 1204, control is transferred back to decision block 1102 of FIG. 11.

Figure 13:
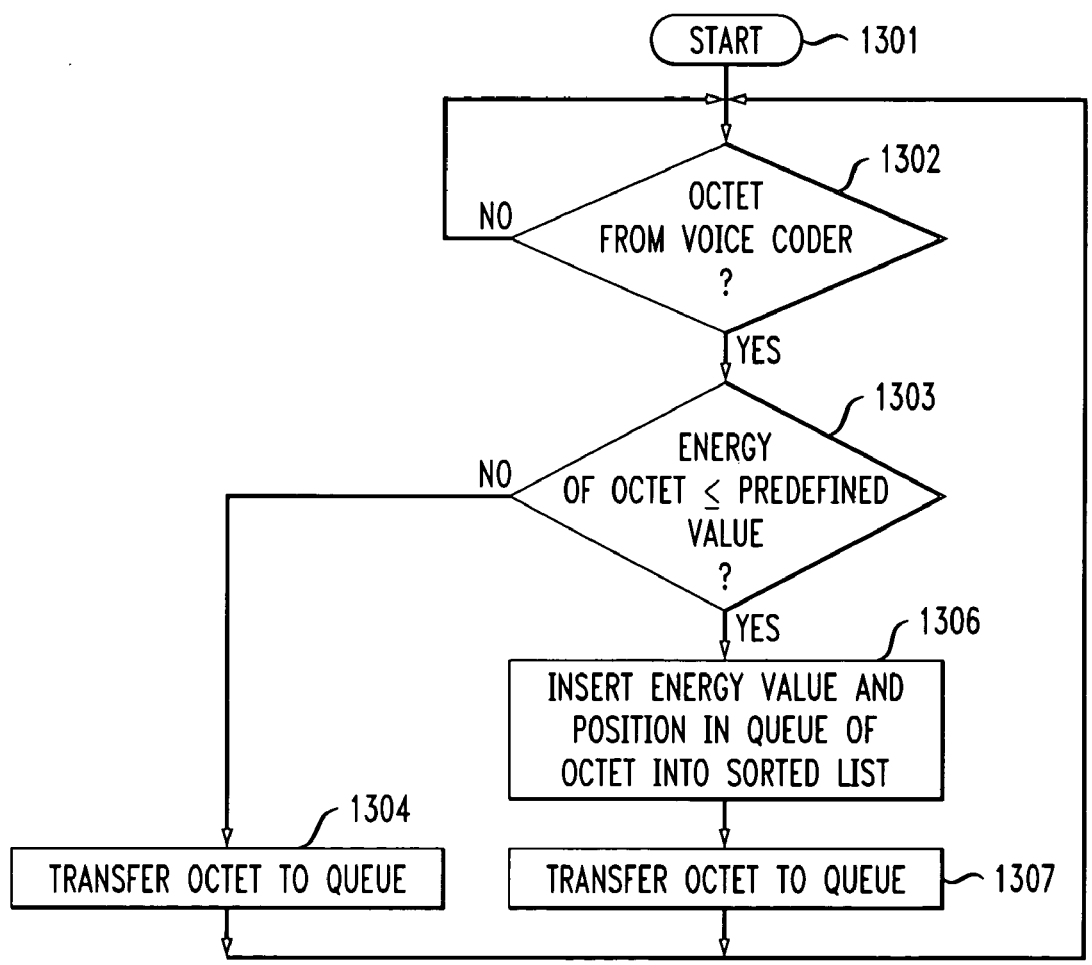
FIG. 13 illustrates, in flowchart form, the operations performed by a low energy detector in implementing the second embodiment of the invention.

FIG. 13 illustrates, in flowchart form, the operations of low energy detector 303 of FIG. 3. Once started from block 1301, decision block 1302 determines if there is an octet being transmitted from voice encoder 306. If the answer is no, the operation of decision block 1302 is repeated. If the answer is yes, decision block 1303 determines the energy level of the octet and makes the decision of whether the energy level of the octet is less than or equal to a predefined value. If the answer is no, block 1304 transfers the octet to sample queue 304 before returning control to decision block 1302. If the answer in decision block 1303 is yes, block 1306 inserts the energy value and the position in sample queue 304 of the octet into the sorted list maintained in memory 308. Finally, block 1307 transfers the octet to sample queue 304 before returning control to decision block 1302.

Figure 14:
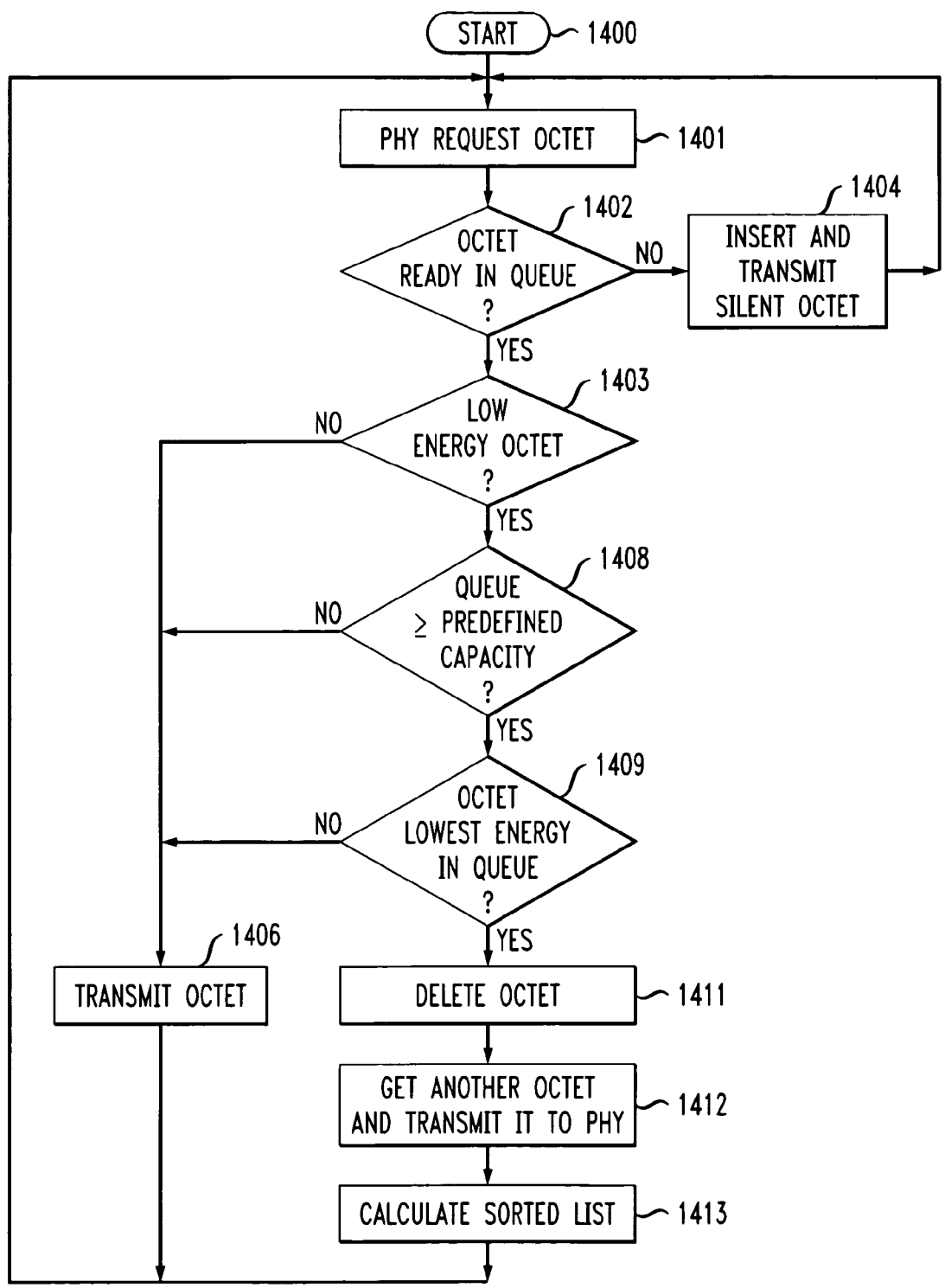
FIG. 14 illustrates, in flowchart form, the operations performed by an insert/removal circuit in implementing another embodiment of the invention.

FIG. 14 illustrates, in flowchart form, operations that may be performed by another embodiment of insert/remove circuit 302 of FIG. 3. It is assumed that low energy detector 303 whose operations are illustrated in FIG. 13 is operating in the same manner with respect to sorted list 308. After being started by block 1400, block 1401 waits until the PHY requests an octet. When this occurs, control is transferred to decision block 1402. The latter decision block determines if an octet is ready in the queue. If the answer is no, block 1404 inserts and transmits a silent octet to the PHY. If the answer in decision block 1402 is yes, control is transferred to decision block 1403 which determines if the octet, that is ready, is a low energy octet. If the answer is no, block 1406 transmits the octet to PHY. Note, that block 1406 also operates with respect to the sorted list in memory 308 to properly update that list. After block 1406 has transmitted the octet, control is transferred back to block 1401.

Returning to decision block 1403, if the octet, that is ready, is a low energy octet, control is transferred to decision block 1408. The latter decision block determines if the queue is above or equal to a predefined capacity. At or above this capacity, a low energy octet will be deleted if it is the lowest energy octet presently in the queue. If the answer in decision block 1408 is no, control is transferred to block 1406. If the answer in decision block 1408 is yes, decision block 1409 determines if the octet, that is ready, is the lowest energy octet in the queue. If the answer is no, control is transferred to block 1406. If the answer in decision block 1409 is yes, block 1411 deletes the octet, gets another octet and transmits that octet to the PHY before transferring control to block 1413. Block 1413 recalculates the sorted list stored in memory 308 of FIG. 3 to properly update it and to properly position it for the removal of two octets before transferring control back to block 1401.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for compensating for unsynchronized data transmission of synchronous data, comprising the steps of:
    receiving samples of synchronous data;
    storing the received samples in a queue;
    maintaining a sorted list of low energy samples stored in the queue;
    comparing a number of the samples in the queue with a predefined capacity of the queue; and
    determining a position in the queue of a previously deleted low energy sample;
    removing a one of the low energy samples listed in the sorted list from the queue if the number is greater than the predefined capacity upon the one of the low energy samples having lower energy than any other ones of the low energy samples if the one of the low energy samples is a predefined distance in the queue from the previously deleted low energy sample; and
    selecting another one of the low energy samples having the next lowest energy than any other ones of the low energy samples to be removed if the one of the low energy samples is not the predefined distance from the previously deleted low energy sample and the other one of the low energy samples is the predefined distance from the previously deleted low energy sample.

2. The method of claim 1 wherein the step of removing further comprises the step of updating the sorted list to reflect the deletion of the one of the low energy samples.

3. The method of claim 1 wherein the step of determining the position comprises the step of updating the position in the queue of the previously deleted low energy sample.

4. The method of claim 1 wherein the step of removing further comprises updating the sorted list to reflect the deletion of the other one of the low energy samples.

5. The method of claim 1 wherein the step of determining the position comprises updating the position in the queue of the previously deleted low energy sample.

6. The method of claim 1 wherein the step of maintaining comprises the steps of determining if one of the received samples is below a predefined energy level;
    inserting the one of the received samples into the queue; and
    recording the energy level of the one of the received samples in the sorted list if the one of the received samples is below a predefined energy level.

7. The method of claim 6 wherein the step of maintaining further comprises positioning the one of the received samples in sorted list relative to energy levels of the other low energy samples in the sorted list if the one of the received samples is below a predefined energy level.

8. An apparatus for compensating for unsynchronized data transmission of synchronous data, comprising:
    a receiver for receiving samples of synchronous data;
    a queue for storing the received samples;
    a memory for storing a sorted list of low energy samples in the queue;
    a low energy detector for storing received samples into the queue and for inserting energy levels of the low energy samples into the sorted list;
    a circuit further determines a position in the queue of a previously deleted low energy sample;
    the circuit further deleting one of the low energy samples from the queue if the queue has exceeded a predefined capacity of the queue upon the one of the low energy samples having lower energy than any other ones of the low energy samples if the one of the low energy samples is a predetermined distance in the queue from the previously deleted low energy sample; and
    the circuit further selects another one of the low energy samples having the next lowest energy than any other ones of the low energy samples to be removed if the one of the low energy samples is not the predefined distance from the previously deleted low energy sample and the other one of the low energy samples is the predefined distance from the previously deleted low energy sample.

9. The apparatus of claim 8 wherein the circuit further updates the sorted list stored in the memory to reflect the deletion of the one of the low energy samples.

10. The apparatus of claim 9 wherein the circuit further updates the position in the queue of the previously deleted low energy sample.

11. The apparatus of claim 8 wherein the circuit further updates the sorted list stored in the memory to reflect the deletion of the other one of the low energy samples.

12. The apparatus of claim 8 wherein the circuit further updates the position in the queue of the previously deleted low energy sample.

13. The apparatus of claim 8 wherein low energy detector determines if one of the received samples is below a predefined energy level, inserts the one of the received samples into the queue, and records the energy level of the one of the received samples in the sorted list if the one of the received samples is below a predefined energy level.

14. The apparatus of claim 13 wherein the low energy detector positions the one of the received samples in sorted fist relative to energy levels of the other low energy samples in the sorted list if the one of the received samples is below a predefined energy level.

15. The apparatus of claim 8 wherein the circuit further determining that the next one of the received samples having the lowest energy of any sample in the queue by accessing the sorted list.

* * * * *